United States Patent
Katsumura et al.

(10) Patent No.: US 6,695,987 B2
(45) Date of Patent: Feb. 24, 2004

(54) PRODUCTION METHOD FOR OPTICAL DISC

(75) Inventors: Masahiro Katsumura, Tsurugashima (JP); Tetsuya Iida, Tsurugashima (JP); Takashi Ueno, Tokyo-to (JP)

(73) Assignees: Pioneer Corporation, Tokyo-To (JP); Furuya Metal Co., Ltd., Tokyo-To (JP)

(*) Notice: Subject to any disclaimer, the term of this patent is extended or adjusted under 35 U.S.C. 154(b) by 444 days.

(21) Appl. No.: 09/853,676

(22) Filed: May 14, 2001

(65) Prior Publication Data

US 2001/0050444 A1 Dec. 13, 2001

(30) Foreign Application Priority Data

May 12, 2000 (JP) ..................... P2000-139385

(51) Int. Cl.[7] .............................. B29D 11/00
(52) U.S. Cl. .................. 264/1.33; 205/68; 205/70; 264/1.36; 264/2.5; 425/810
(58) Field of Search ............... 264/1.33, 1.36, 264/2.5, 106, 107, 485; 425/810; 205/68, 70; 430/321

(56) References Cited

U.S. PATENT DOCUMENTS

| 4,482,511 A | * | 11/1984 | Komatsubara ............ 264/2.5 |
| 5,385,638 A | * | 1/1995 | Isono et al. |
| 5,756,130 A | * | 5/1998 | Umebayashi et al. ....... 425/810 |
| 5,851,251 A | * | 12/1998 | Kondo et al. |
| 6,344,275 B2 | * | 2/2002 | Katsumura et al. |

* cited by examiner

Primary Examiner—Mathieu D. Vargot
(74) Attorney, Agent, or Firm—Sughrue Mion, PLLC (57) ABSTRACT

The present invention is to provide a production method for an optical disc, capable of obtaining a good S/N ratio without deterioration of the stamper quality due to reaction with an electron attractive group contained in a resist material. The processes of forming a resist film on a substrate, patterning the resist film on the substrate by an electron beam cutting, forming a nickel alloy thin film on the patterned resist film, forming a nickel layer on the nickel alloy thin film by the electrocasting, and injection molding of a resin, using the nickel layer peeled off from the nickel alloy thin film as a stamper, are provided. The nickel alloy thin film has a composition containing Ni element as the main component as well as Ru element by less than 25% by weight.

27 Claims, 7 Drawing Sheets

| MATERIAL | IMMERSION RESULT IN NaCl AQUEOUS SOLUTION | RESULT OF HIGH TEMPERATURE AND HUMIDITY RESISTANCE ACCELERATION TEST |
|---|---|---|
| PURE Ni | DARKENING OF END PORTION (BY CHLORINATION REACTION) | END PORTION DARKENING AND PEELING |
| Ni-1wt%Ru | NO CHANGE | NO CHANGE |
| Ni-5wt%Ru | NO CHANGE | NO CHANGE |
| Ni-10wt%Ru | NO CHANGE | NO CHANGE |
| Ni-20wt%Ru | NO CHANGE | SLIGHT DARKENING OF END PORTION |
| Ni-25wt%Ru | SLIGHT DARKENING OF END PORTION | SLIGHT DARKENING OF END PORTION |
| Ni-1wt%Cu | NO CHANGE | NO CHANGE |
| Ni-5wt%Cu | NO CHANGE | NO CHANGE |
| Ni-10wt%Cu | NO CHANGE | NO CHANGE |
| Ni-20wt%Cu | NO CHANGE | SLIGHT DARKENING OF END PORTION |
| Ni-25wt%Cu | SLIGHT DARKENING OF END PORTION | SLIGHT DARKENING OF END PORTION |
| Ni-1wt%Ti | NO CHANGE | NO CHANGE |
| Ni-5wt%Ti | NO CHANGE | NO CHANGE |
| Ni-10wt%Ti | NO CHANGE | NO CHANGE |
| Ni-20wt%Ti | NO CHANGE | NO CHANGE |
| Ni-25wt%Ti | NO CHANGE | NO CHANGE |
| Ni-1wt%Ag | NO CHANGE | NO CHANGE |
| Ni-5wt%Ag | NO CHANGE | NO CHANGE |
| Ni-10wt%Ag | NO CHANGE | NO CHANGE |
| Ni-20wt%Ag | NO CHANGE | NO CHANGE |
| Ni-25wt%Ag | NO CHANGE | NO CHANGE |
| Ni-1wt%P | NO CHANGE | NO CHANGE |
| Ni-5wt%P | NO CHANGE | NO CHANGE |
| Ni-10wt%P | NO CHANGE | NO CHANGE |
| Ni-20wt%P | NO CHANGE | SLIGHT DARKENING OF END PORTION |
| Ni-25wt%P | NO CHANGE | SLIGHT DARKENING OF END PORTION |

FIG.5

| MATERIAL | IMMERSION RESULT IN NaCl AQUEOUS SOLUTION | RESULT OF HIGH TEMPERATURE AND HUMIDITY RESISTANCE ACCELERATION TEST |
|---|---|---|
| Ni-1wt%Mg | NO CHANGE | NO CHANGE |
| Ni-5wt%Mg | NO CHANGE | NO CHANGE |
| Ni-10wt%Mg | NO CHANGE | NO CHANGE |
| Ni-20wt%Mg | NO CHANGE | NO CHANGE |
| Ni-25wt%Mg | SLIGHT DARKENING OF END PORTION | NO CHANGE |
| Ni-1wt%Cr | NO CHANGE | NO CHANGE |
| Ni-5wt%Cr | NO CHANGE | NO CHANGE |
| Ni-10wt%Cr | NO CHANGE | NO CHANGE |
| Ni-20wt%Cr | NO CHANGE | NO CHANGE |
| Ni-25wt%Cr | SLIGHT DARKENING OF END PORTION | SLIGHT DARKENING OF END PORTION |
| Ni-1wt%Au | NO CHANGE | NO CHANGE |
| Ni-5wt%Au | NO CHANGE | NO CHANGE |
| Ni-10wt%Au | NO CHANGE | NO CHANGE |
| Ni-20wt%Au | NO CHANGE | NO CHANGE |
| Ni-25wt%Au | SLIGHT DARKENING OF END PORTION | NO CHANGE |
| Ni-1wt%Si | NO CHANGE | NO CHANGE |
| Ni-5wt%Si | NO CHANGE | NO CHANGE |
| Ni-10wt%Si | NO CHANGE | NO CHANGE |
| Ni-20wt%Si | NO CHANGE | NO CHANGE |
| Ni-25wt%Si | SLIGHT DARKENING OF END PORTION | SLIGHT DARKENING OF END PORTION |

| ELECTRODE MATERIAL | PURE Ni | Ni-5wt%Ru |
|---|---|---|
| DISK NOISE [dB] | −74.3 | −79.7 |

PRODUCTION METHOD FOR OPTICAL DISC

BACKGROUND OF THE INVENTION

1. Field of the Invention

The present invention relates to a thin film for stamper formation, formed on the surface of a patterned resist material, to be used as an electrode for electrocasting of a stamper material, and an electrode material for stamper formation to be used as the material for such an electrode.

2. Description of the Related Art

Figure 8A:
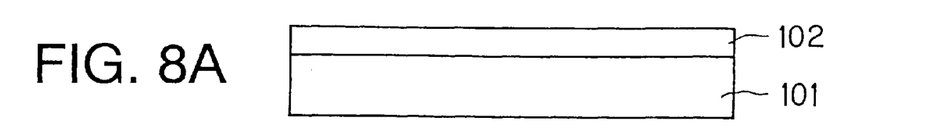
FIG. 8A is a cross-sectional view showing the state with a resist applied.
Figure 8B:
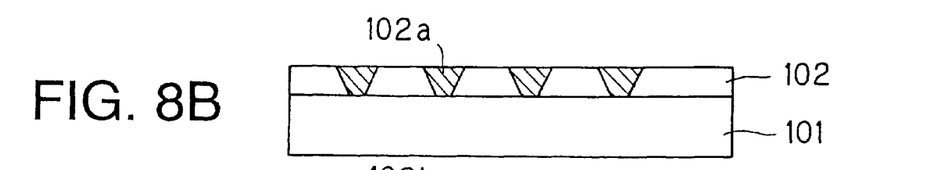
FIG. 8B is a cross-sectional view showing the state with a latent image formed.
Figure 8C:
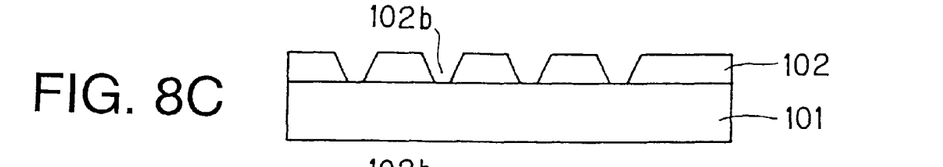
FIG. 8C is a cross-sectional view showing the state after development.
Figure 8D:
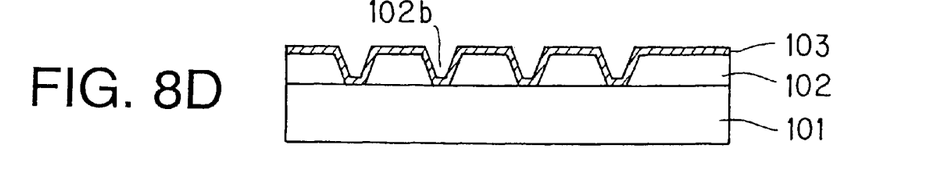
FIG. 8D is across-sectional view showing the state with a nickel alloy thin film formed.
Figure 8E:
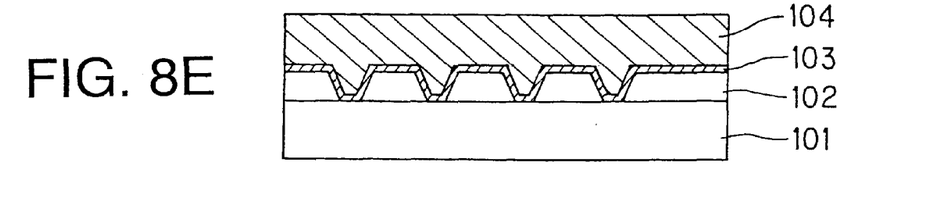
FIG. 8E is a cross-sectional view showing the state with a nickel layer formed.
Figure 8F:
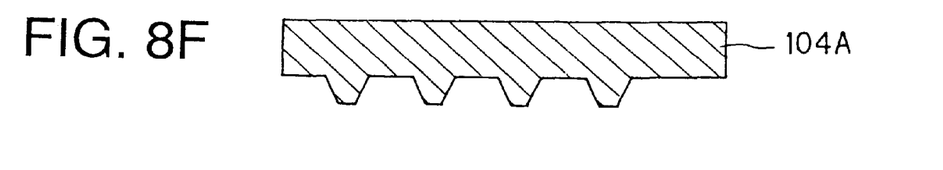

Optical discs such as a CD and a DVD are mass-produced, using an optical disc original disc called a stamper. FIGS. 8A to 8F show a conventional stamper production method. First, as shown in FIG. 8A, a photoresist film 102 is formed on a glass substrate 101 by spin coating, or the like. Then, as shown in FIG. 8B, the photo resist film 102 is exposed by a laser beam so as to form a latent image 102a. Next, by developing the photo resist film 102, a pattern having a groove part 102b as shown in FIG. 8C is formed. Then, as shown in FIG. 8D, a nickel thin film 103 is formed on the surface of the photo resist film 102 and the glass substrate 101 by a sputtering method, a vapor deposition method, or the like. Thereafter, as shown in FIG. 8E, by applying a nickel electrocasting on the nickel thin film 103 surface, using the nickel thin film 103 as an electrode, a nickel layer 104 is formed. As shown in FIG. 8F, after peeling off the nickel layer 104 from the glass substrate 101, by polishing the upper surface of the nickel layer 104, or the like in FIG. 8F, a stamper 104A can be obtained.

A higher recording density is further required to the optical discs. The expected demand of a high recording density for ensuring a recording capacity of as much as a several tens of GB or more in a 12 cm diameter disc cannot be dealt with by the above-mentioned laser cutting using a laser beam, and thus an electron beam cutting using an electron beam attracts the attention as a method instead of the laser beam cutting. According to the electron beam cutting, a highly fine pattern can be formed compared with the conventional laser beam cutting.

However, in order to execute the electron beam cutting, the electron absorption sensitivity of the resist material should be improved, and thus an electron attractive group such as a chlorine, a sulfur, and a fluorine, or the like is introduced into the resist material. However, it was revealed that a problem of the stamper quality deterioration arises by the damage of the nickel thin film due to reaction of the electron attractive group in the resist material and the nickel thin film at the time of applying the nickel electrocasting.

SUMMARY OF THE INVENTION

Accordingly, an object of the present invention is to provide a production method for an optical disc, capable of obtaining a good S/N ratio without deterioration of the stamper quality due to reaction with an electron attractive group contained in a resist material.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Ru element by less than 25% by weight.

According to the production method for an optical disc, since reaction of Ni in the electrode material and an electron attractive group contained in the resist material can be restrained, the stamper quality deterioration can be prevented. Moreover, since the electrode can be formed with the excellent flatness, the S/N ratio of the optical disc can be improved.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Cu element by less than 25% by weight.

According to the production method for an optical disc, since reaction of Ni in the electrode material and an electron attractive group contained in the resist material can be restrained, the stamper quality deterioration can be prevented.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as P element by less than 25% by weight.

According to the production method for an optical disc, since reaction of Ni in the electrode material and an electron attractive group contained in the resist material can be restrained, the stamper quality deterioration can be prevented.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Mg element by less than 25% by weight.

According to the production method for an optical disc, since reaction of Ni in the electrode material and an electron attractive group contained in the resist material can be restrained, the stamper quality deterioration can be prevented.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Cr element by less than 25% by weight.

According to the production method for an optical disc, since reaction of Ni in the electrode material and an electron attractive group contained in the resist material can be restrained, the stamper quality deterioration can be prevented. Moreover, since the electrode can be formed with the excellent flatness, the S/N ratio of the optical disc can be improved.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Au element by less than 25% by weight.

According to the production method for an optical disc, since reaction of Ni in the electrode material and an electron attractive group contained in the resist material can be restrained, the stamper quality deterioration can be prevented.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Si element by less than 25% by weight.

According to the production method for an optical disc, since reaction of Ni in the electrode material and an electron attractive group contained in the resist material can be restrained, the stamper quality deterioration can be prevented.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Ti element by less than 50% by weight.

According to the production method for an optical disc, since reaction of Ni in the electrode material and an electron attractive group contained in the resist material can be restrained, the stamper quality deterioration can be prevented.

A production method for an optical disc according to the present invention comprises the processes of forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Ag element by less than 50% by weight.

According to the production method for an optical disc, since reaction of Ni in the electrode material and an electron attractive group contained in the resist material can be restrained, the stamper quality deterioration can be prevented. Moreover, since the electrode can be formed with the excellent flatness, the S/N ratio of the optical disc can be improved.

The metal layer can be made of nickel. Moreover, the metal layer can also be made of nickel alloy.

Although the reference numerals in the accompanied drawings are applied in the parentheses in order to facilitate understanding of the present invention, the present invention is not limited to the embodiment shown in the figures thereby.

BRIEF DESCRIPTION OF THE DRAWINGS

FIGS. 1A to 1F are cross-sectional views showing processes for producing a stamper for the optical disc production, using a thin film for stamper formation; FIG. 1F is a cross-sectional view showing a stamper.

FIGS. 8A to 8F are cross-sectional views showing conventional processes for producing a stamper for the optical disc production, using a thin film for stamper formation; FIG. 8F is a cross-sectional view showing a stamper.

DESCRIPTION OF THE PREFERRED EMBODIMENT

Hereinafter, an embodiment of a production method for an optical disc according to the present invention will be explained with reference to FIGS. 1A to 7. FIGS. 1A to 1F are cross-sectional views showing processes for producing a stamper for the optical disc production, and FIG. 2 is a chart showing the details of the processes.

Figure 1A:
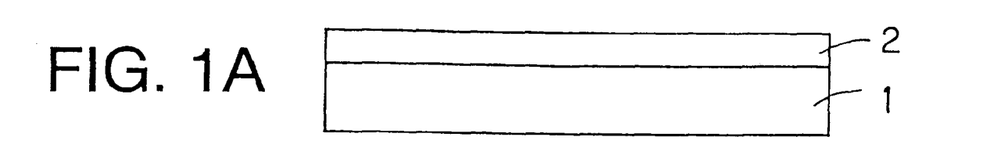
FIG. 1A is a cross-sectional view showing the state with a resist applied.
Figure 1B:
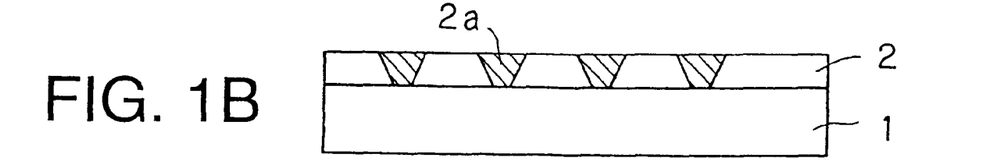
FIG. 1B is across-sectional view showing the state with a latent image formed.
Figure 1C:
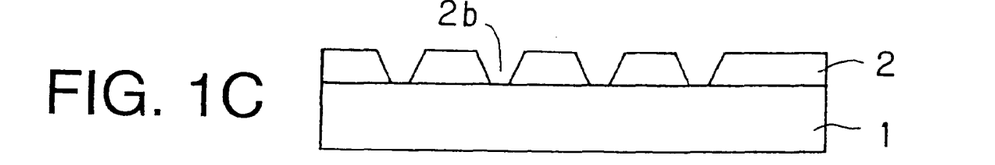
FIG. 1C is a cross-sectional view showing the state after development.
Figure 2:
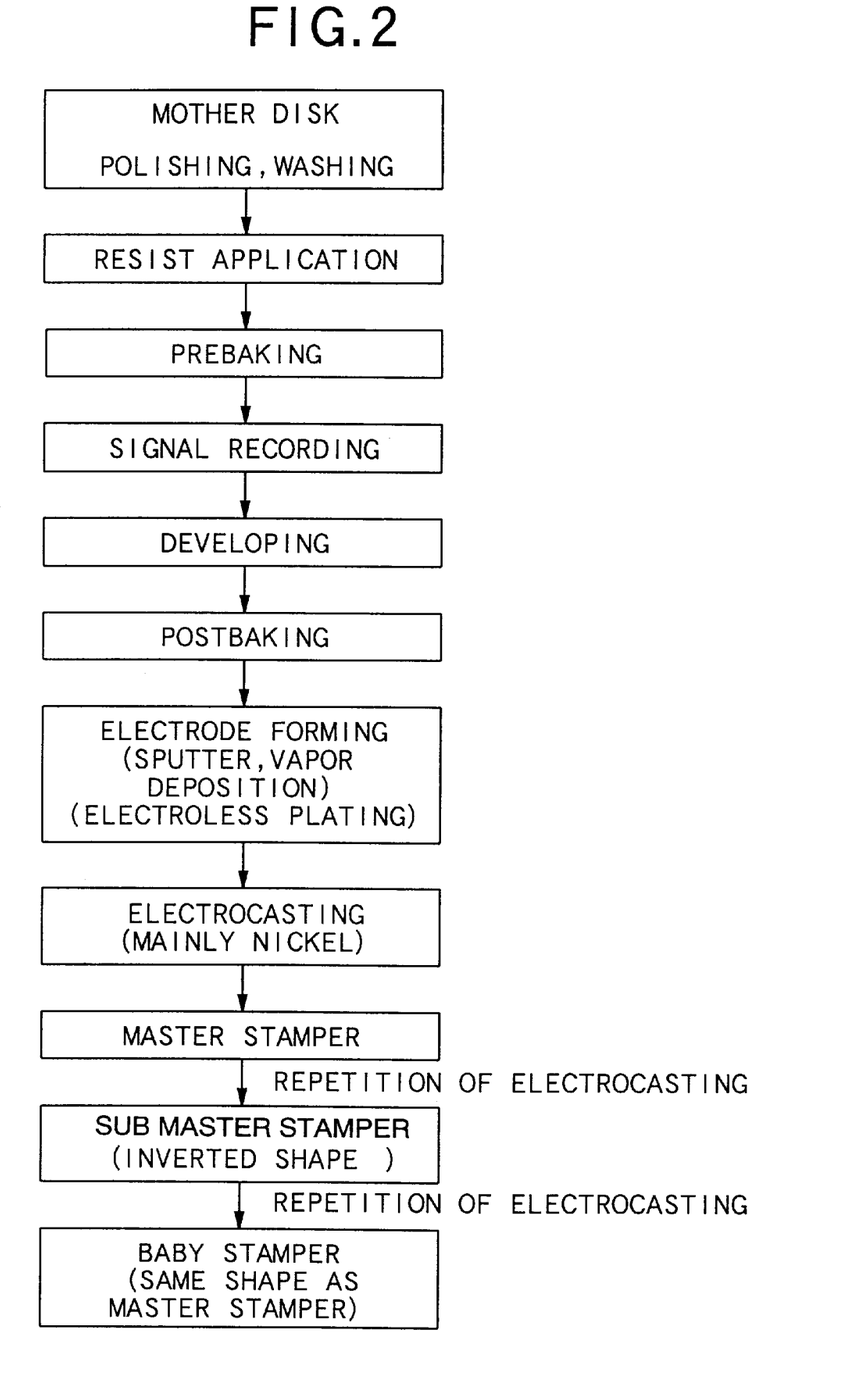
FIG. 2 is a chart showing the details of processes for producing a stamper for producing an optical disc, using a thin film for stamper formation.

First, as shown in FIGS. 1A and 2, after polishing and washing a glass substrate 1, an electron beam resist film 2 is produced for an electron beam on the glass substrate 1 by spin coating, or the like. Next, the electron beam resist film 2 is pre-baked, and the electron beam resist film 2 is exposed by an electron beam so as to form a latent image 2a as shown in FIG. 1B ("signal recording" in FIG. 2). Then, the electron beam resist film 2 is developed for forming a groove part 2b as shown in FIG. 1C, and the electron beam resist film 2 is post-baked.

Figure 1D:
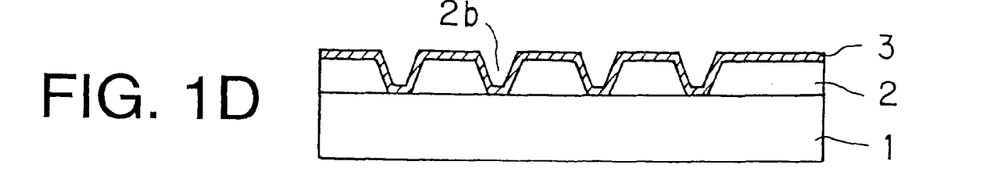
FIG. 1D is a cross-sectional view showing the state with a nickel alloy thin film formed.

Next, as shown in FIG. 1D, a nickel alloy thin film 3 is formed on the surface of the electron beam resist film 2 and the glass substrate 1 by a sputtering method, a deposition method, or an electroless plating. The material of the nickel alloy thin film will be described later.

Figure 1E:
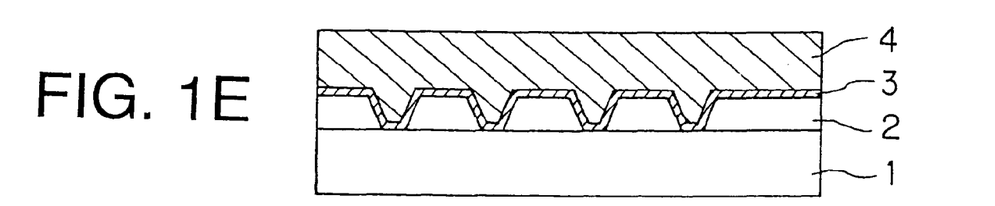
FIG. 1E is a cross-sectional view showing the state with a nickel layer formed.
Figure 1F:
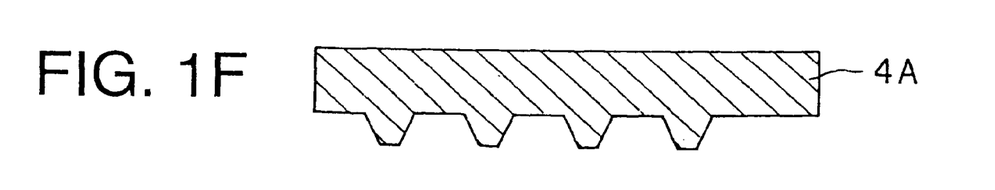

Thereafter, as shown in FIG. 1E, by applying a nickel electrocasting to the nickel alloy thin film 3 surface, using the nickel alloy thin film 3 as an electrode, a nickel layer 4 is formed. Then, as shown in FIG. 1F, after peeling off the nickel layer 4 from the glass substrate 1, a master stamper 4A is obtained by polishing the upper surface of the nickel layer 4 of FIG. 1F, or the like. It is possible to form a nickel alloy layer by electrocasting in stead of the nickel layer 4, and use the peeled-off nickel alloy layer as the stamper.

As shown in FIG. 2, by adhering a nickel on the master stamper 4A by electrocasting again, a sub master stamper can be obtained with the shape reversed. By further adhering a nickel on the sub master stamper by electrocasting, a baby stamper can be obtained with the same shape as the master stamper. It is also possible to further transfer the baby stamper shape for producing a new stamper.

Figure 3:
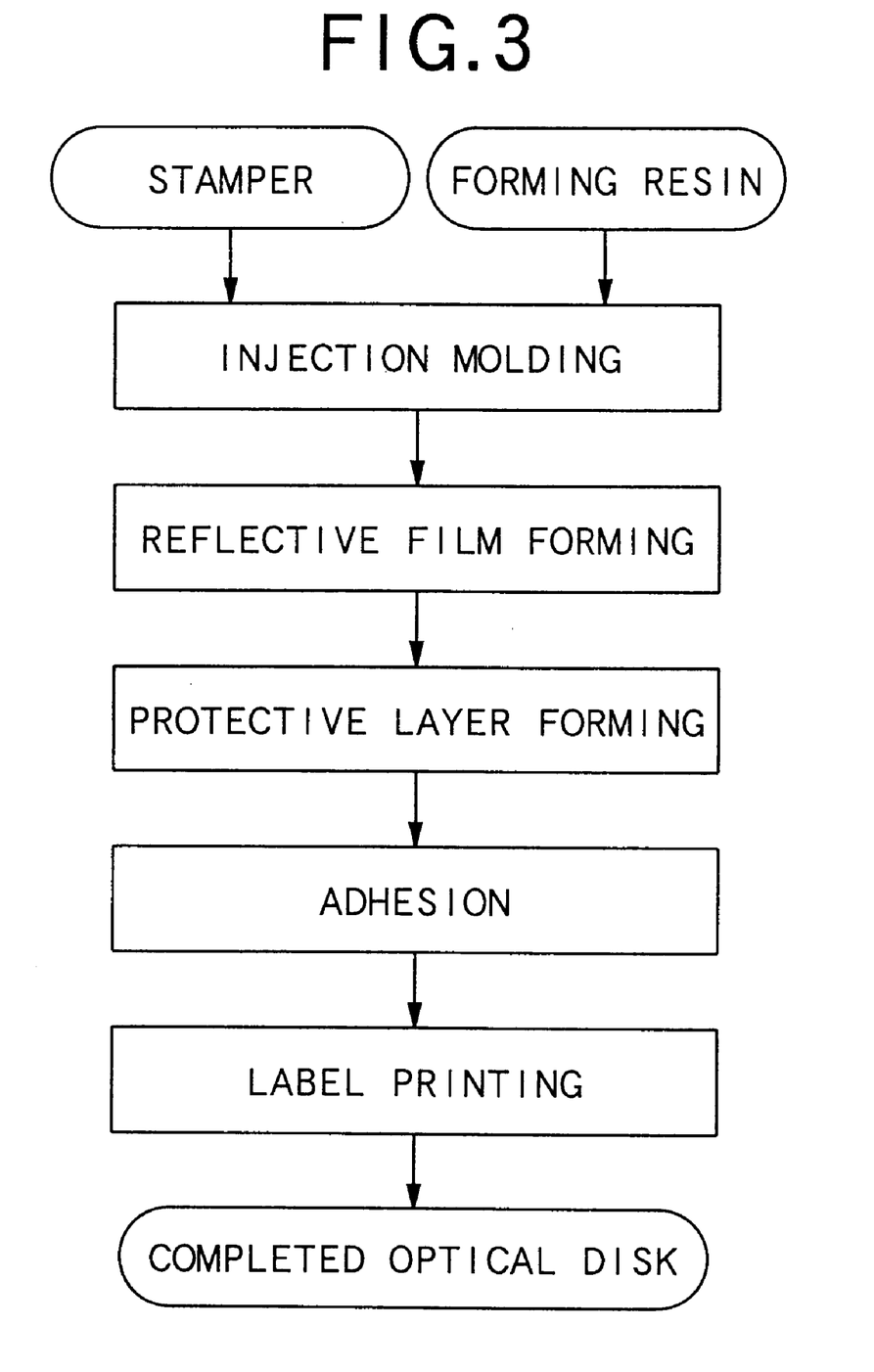
FIG. 3 is a chart showing processes for producing an optical disc, using a stamper for producing an optical disc.

FIG. 3 is a chart showing processes for producing an optical disc, using the master stamper 4A or a baby stamper. As shown in FIG. 3, after injection molding using a stamper as the mold, a reflection film, a protection film, and the like are formed so as to produce an optical disc. Since the processes in FIG. 3 are the same as ordinary production processes, detailed explanation is not given.

As the material for the nickel alloy thin film 3, a nickel alloy containing Ni elements as the main component as well as at least one selected from the group consisting of Ru, Cu, P, Mg, Cr, Au, Si, Ti, and Ag by less than 50% by weight, further preferably by less than 25% by weight. In this embodiment, by forming the nickel alloy thin film 3 using a Ni alloy with the above-mentioned elements added, damage of the nickel alloy thin film 3 can be prevented at the time of forming the nickel layer 4 by electrocasting.

In the case at least one selected from the group consisting of P, Mg, and Si is added to the nickel alloy thin film 3 by less than 25% by weight, these elements cannot react with Ni, the main component, unless they are heated to at least about 400 to 500° C. Therefore, P, Mg, or Si in the thin film state is precipitated on the interface of the Ni particles so as to be coupled with the oxygen and oxidized under the environment other than in an inert atmosphere. In this case, in the alloy thin film state containing Ni as the main component, the oxide film of the added P, Mg or Si is precipitated not only on the interface of the Ni particles but also on the thin film surface. It was confirmed that the surface oxide film precipitated on the thin film surface thereby becomes a non-conductor so as to serve as a barrier material with respect to the reaction of an external active metal or non-metal and Ni and improves the weather resistance of the Ni alloy. However, since P, Mg or Si as an element to be added is easily coupled not only with the oxygen but also with the other active non-metal elements at the same time, in the case it is added by an excessive amount, the weather resistance is inversely lowered. Therefore, an amount less than 20% by weight is considered to be appropriate.

Similarly, in the case Ni is used as the main component and Ti is added thereto, the Ti is precipitated on the Ni particle grain boundary except the case of forming a compound by the reaction while heating under a high temperature atmosphere. It is considered that although a nonconductor is not formed in the Ni alloy with Ti added, since the Ti is stable with respect to chlorine, the effect of restraining leaching of active elements to the Ni particles or the chemical reaction can be provided, and thus the chemical reaction with respect to the Ni particles can be prevented.

Moreover, a stable complete solid solution is confirmed in an alloy with Cu or Au added to Ni. In this case, Cu or Au as the element to be added has a high chlorine resistance, and thus it is coupled with Ni atomically by solidly dissolved so as to form distortion in the crystal structure of Ni as the main component. Since the coupling property with respect to the chlorine is alleviated due to dependency on the added element in this Ni solid solution alloy. The stable state cannot always be provided with respect to the chlorine, but the chemical reactivity with respect to the chlorine can be weakened. According to an experiment, chlorination was not formed in such solid solution.

Furthermore, in the case of adding Ru, Ag, or Cr to Ni, it is solidly dissolved for a specific addition amount, and it is confirmed that at least in the case of a less than 10% by weight addition, it is solidly dissolved and in the same state as the solid solution obtained by the Cu or Ag addition. In the case each of Ru, Ag, or Cr is added by an amount more than 10% by weight so as to exceed the solid solution limit, the entire addition amount is not solidly dissolved so that Ru, Ag, or Cr is precipitated on the solid solution particle grain boundary. However, it is confirmed that also in this case the chlorine resistance can be improved compared with pure Ni.

Moreover, an alloy thin film with at least one selected from the group consisting of Ru, Ag, and Cr added to Ni not only improves the chlorine resistance but also improves the flatness of the thin film. The thin film flattening is confirmed by the signal characteristic at the time of reproduction of an optical disc produced using a stamper formed with the alloy thin film. In the case added Ru, Ag, or Cr is solidly dissolved, it is confirmed that the crystal lattice of Ni as the main component is distorted so that the thin film grains are made finer. In the case of a Ni alloy with a composition further exceeding the solid solution limit, the grain growth of the solidly dissolved Ni solid solution alloy particles can be restrained as well as the addition component not solidly dissolved of the added element existing in the grain boundary is considered to have an effect of promoting the stress alleviation.

The nickel alloy with the composition described in this embodiment has chlorination resistance and bromination resistance while having a spreading property and a processability like the pure Ni, and thus it can be adopted to an application conventionally restricted, or to an applied technology due to the nature of the pure Ni, which can easily be reacted with chlorine and boron.

EXAMPLES

Preparing Ni and sputtering targets of additive metals Ru, Cu, P, Mg, Cr, Au, Si, Ti, and Ag, the sputtering target of specified element and Ni were put in an RF magnetron sputtering apparatus, and a thin film was formed on a quartz substrate. The sputtering target was 3 inches (7.62 cm) in diameter, and 5 mm in thickness, and the distance from the sputtering target to the substrate was about 90 mm. While controlling the discharge amount of metal atoms by RF feed power to Ni and sputtering target of specified element, two metals were stacked up on the substrate simultaneously. As the film forming condition, the final degree of vacuum is $3 \times 10^{-5}$ Pa and the gas pressure when forming film is 0.7 to 1 Pa. The RF feed power was varied in a range of 100 to 500 W depending on the composition of the alloy. Thus, thin films of Ni—Ru alloy, Ni—Cu alloy, Ni—P alloy, Ni—Mg alloy, Ni—Cr alloy, Ni—Au alloy, Ni—Si alloy, Ni—Ti alloy, and Ni—Ag alloy were formed on substrates. In each alloy, the content of Ru, Cu, P, Mg, Cr, Au, Si, Ti, and Ag was varied in five concentrations, 1, 5, 10, 20, and 25 percent by weight. By way of reference, a pure Ni thin film was formed on the substrate by using the same apparatus (see FIG. 4 and FIG. 5).

Figure 4:
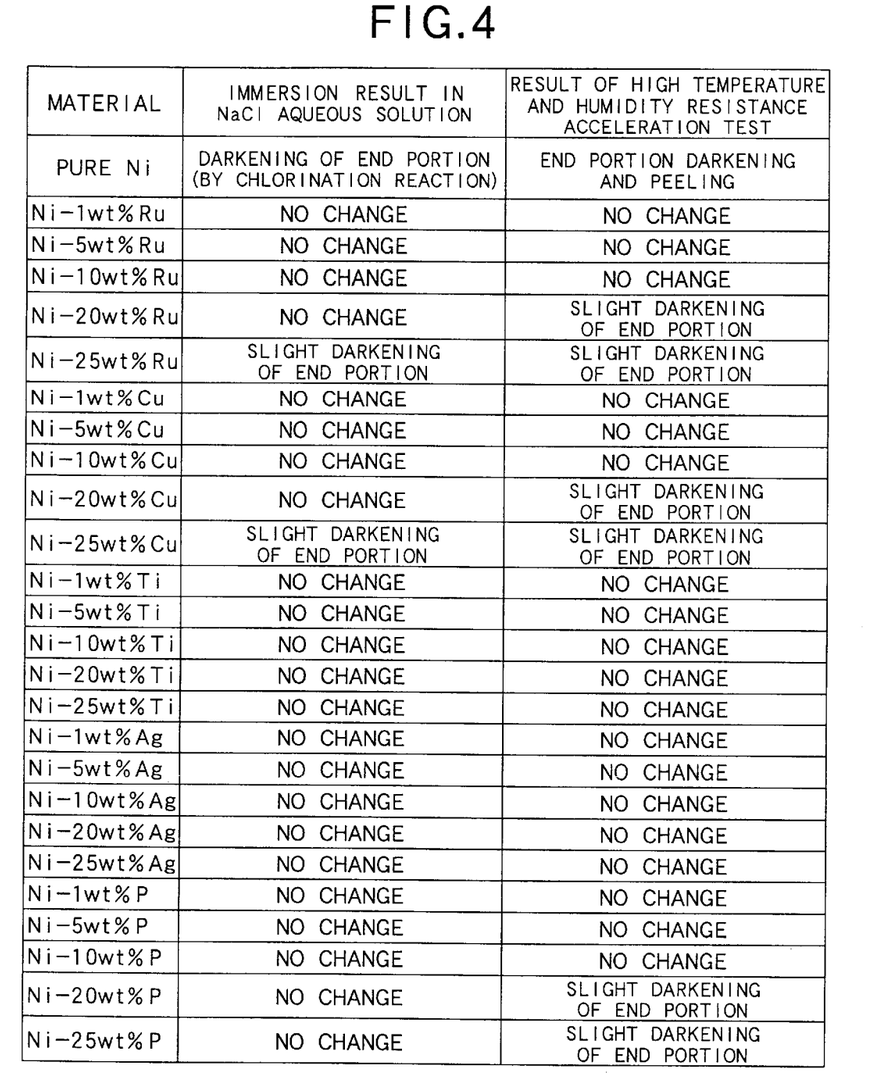
FIG. 4 is a table showing the result of a test of the resistance of pure Ni thin film and a Ni alloy thin film with respect to an aqueous solution of a sodium chloride, and a high temperature humidity resistance acceleration test.
Figure 5:
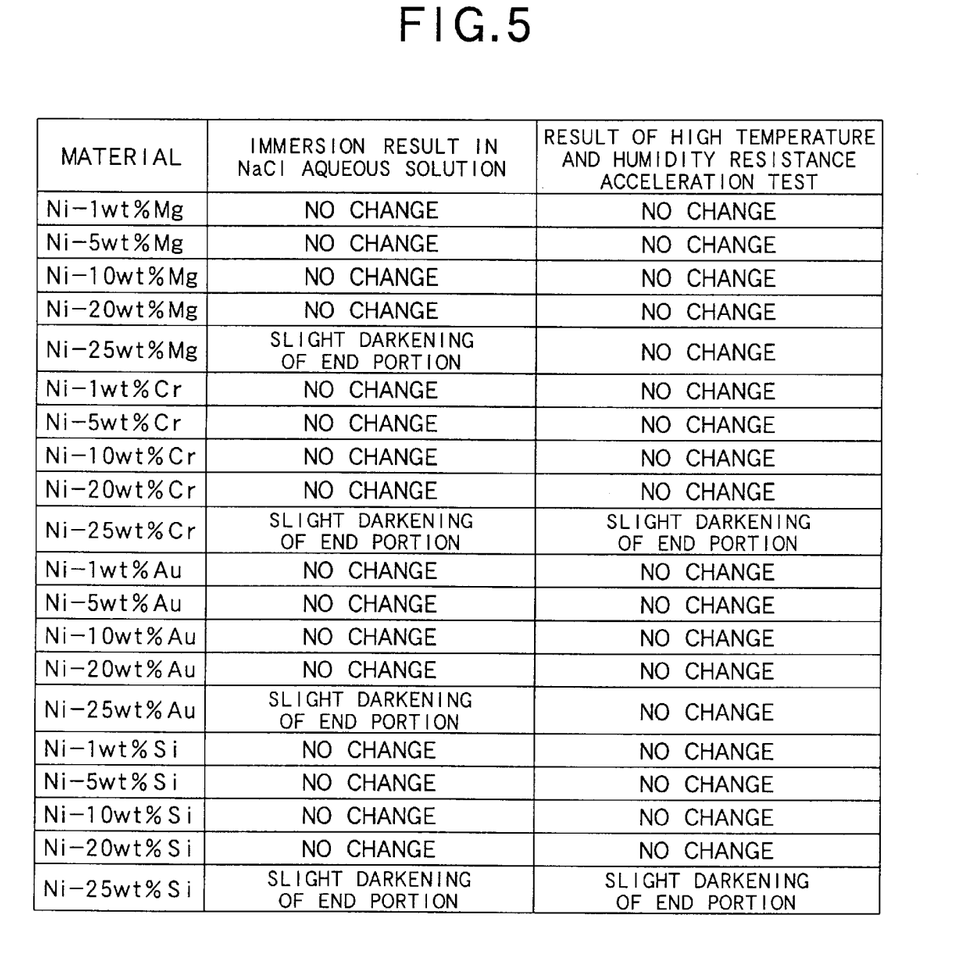
FIG. 5 is a table showing the result of a test of the resistance of a Ni alloy thin film with respect to an aqueous solution of a sodium chloride, and a high temperature humidity resistance acceleration test.

The quartz substrates having the thin films stacked up thereon by the above method were immersed in sodium chloride aqueous solution and let stand for a specified time, and observed changes with time are shown in FIG. 4 and FIG. 5. The sodium chloride contained in the sodium chloride aqueous solution is 5 percent by volume, and the quartz substrates were immersed in the aqueous solution for about 96 hours at ordinary temperature without heating. After standing for 96 hours, changes with time of the thin film were visually observed, and the optical characteristics such as reflectivity of thin film were inspected by spectrophotometer, and changes of surface state of thin films were evaluated.

As a result, when the pure Ni thin film was immersed in the sodium chloride aqueous solution, the end portion was darkened due to chlorination reaction. Besides, as a result of high temperature and humidity resistance acceleration test, aside from darkening of the end portion, peeling of the thin film was recognized.

By contrast, in Ni—Ru alloy, Ni—Cu alloy, Ni—P alloy, Ni—Mg alloy, Ni—Cr alloy, Ni—Au alloy, Ni—Si alloy, Ni—Ti alloy, and Ni—Ag alloy, on the whole, the chlorination reaction was suppressed, and changes by high temperature and humidity resistance acceleration test were also controlled. However, in Ni-25 wt. % Ru, Ni-25 wt. % Cu, Ni-25 wt. % Mg, Ni-25 wt. % Cr, Ni-25 wt. % Au, and Ni-25 wt. % Si, as a result of immersion in sodium chloride aqueous solution, a slight darkening in the end portion was noted. No change was observed in other alloy thin films. Further, in Ni-20 wt. % Ru, Ni-25 wt. % Ru, Ni-20 wt. % Cu, Ni-25 wt. % Cu, Ni-20 wt. % P, Ni-25 wt. % P, Ni-25 wt. % Cr, and Ni-25 wt. % Si, as a result of high temperature and humidity resistance acceleration test, a slight darkening in the end portion was noted.

Figure 6:
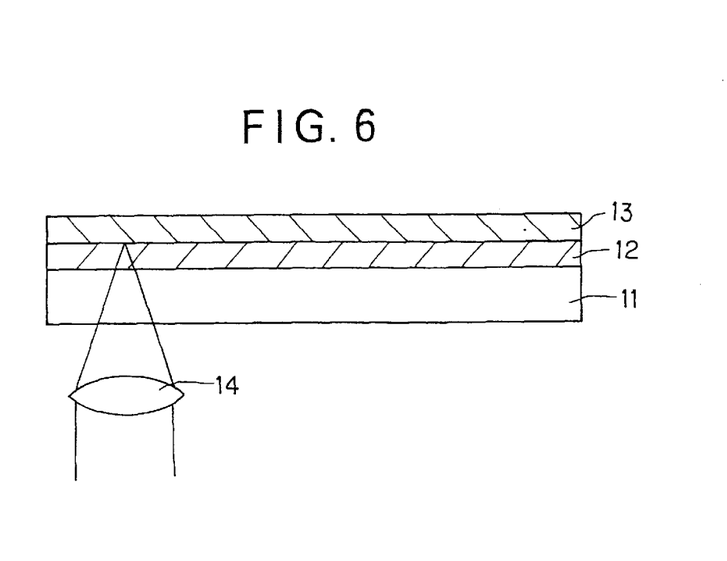
FIG. 6 is a diagram showing a disc noise measuring method by a mirror part reproduction signal of an optical disc.
Figure 7:
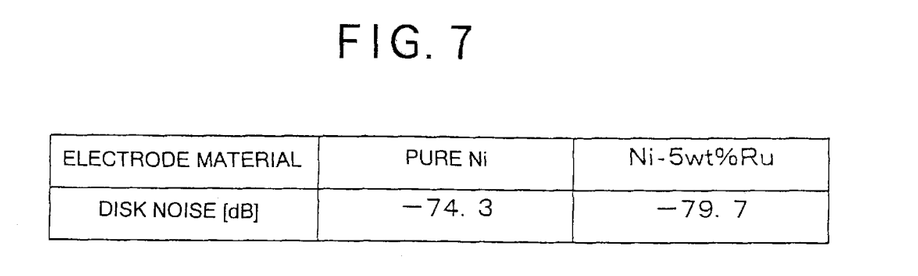
FIG. 7 is a table showing the measurement result of the disc noise.

FIG. 6 is a diagram showing a disk noise measuring method by a mirror section reproduced signal of an optical disk, and FIG. 7 is a diagram showing results of measurement. As shown in FIG. 6, a resist layer 12 is formed on a glass substrate 11, and thin films 13 of pure Ni and Ni-5 wt. % Ru are formed thereon as electrode materials, and mother disks for measurement were prepared. As shown in FIG. 7, using the thin film 13 as the reflective layer, the mother disk for measurement was rotated at linear velocity of 3 m/s and irradiated with light beam through a lens 14 from the side of the glass substrate 11, and the reflected light from the interface of the resist layer 12 and thin film 13 was received. Of the reflected light, the level of 1 MHz component was measured as noise component, and the result is shown in FIG. 7. As shown in FIG. 7, the disk noise is −74.3 dB in the case of using pure Ni as the material for the thin film 13, and the disk noise is −79.7 dB in the case of using Ni-5 wt. % Ru as the material for the thin film 13. Therefore, in the case of Ni-5 wt. % RU, the S/N ratio is improved by more than 5 dB as compared with the case of pure Ni. This result suggests that the flatness of the thin film of Ni-5 wt. % RU is superior to that of the pure Ni, showing excellent suitability as the material used in manufacture of optical mother disk.

"Injection molding of a resin, using a metal layer peeled off from an electrode as a stamper" in the specification is a concept including the case of producing a new stamper (baby stamper, or the like) from ametal layer (master stamper) peeled off from an electrode, and executing injection molding of a resin, using the new stamper as shown in FIG. 2.

The entire disclosure of Japanese Patent Application No. 2000-139385 filed on May 12, 2000 including specification, claims, drawings and summary are incorporated herein by reference in its entirety.

What is claimed is:

1. A production method for an optical disc comprising the processes of:

forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Ru element by less than 25% by weight.

2. A production method for an optical disc comprising the processes of:

forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Cu element by less than 25% by weight.

3. A production method for an optical disc comprising the processes of:

forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as P element by less than 25% by weight.

4. A production method for an optical disc comprising the processes of:

forming a resist film on a substrate, patterning the resist film on the substrate by an electron beam cutting, forming an electrode on the patterned resist film, forming a metal layer on the electrode by the electrocasting, and injection molding of a resin, using the metal layer peeled off from the electrode as a stamper, wherein the electrode contains Ni element as the main component as well as Mg element by less than 25% by weight.

5. A production method for an optical disc comprising the processes of:
   forming a resist film on a substrate,
   patterning the resist film on the substrate by an electron beam cutting,
   forming an electrode on the patterned resist film,
   forming a metal layer on the electrode by the electrocasting, and
   injection molding of a resin, using the metal layer peeled off from the electrode as a stamper,
   wherein the electrode contains Ni element as the main component as well as Cr element by less than 25% by weight.

6. A production method for an optical disc comprising the processes of:
   forming a resist film on a substrate,
   patterning the resist film on the substrate by an electron beam cutting,
   forming an electrode on the patterned resist film,
   forming a metal layer on the electrode by the electrocasting, and
   injection molding of a resin, using the metal layer peeled off from the electrode as a stamper,
   wherein the electrode contains Ni element as the main component as well as Au element by less than 25% by weight.

7. A production method for an optical disc comprising the processes of:
   forming a resist film on a substrate,
   patterning the resist film on the substrate by an electron beam cutting,
   forming an electrode on the patterned resist film,
   forming a metal layer on the electrode by the electrocasting, and
   injection molding of a resin, using the metal layer peeled off from the electrode as a stamper,
   wherein the electrode contains Ni element as the main component as well as Si element by less than 25% by weight.

8. A production method for an optical disc comprising the processes of:
   forming a resist film on a substrate,
   patterning the resist film on the substrate by an electron beam cutting,
   forming an electrode on the patterned resist film,
   forming a metal layer on the electrode by the electrocasting, and
   injection molding of a resin, using the metal layer peeled off from the electrode as a stamper,
   wherein the electrode contains Ni element as the main component as well as Ti element by less than 50% by weight.

9. A production method for an optical disc comprising the processes of:
   forming a resist film on a substrate,
   patterning the resist film on the substrate by an electron beam cutting,
   forming an electrode on the patterned resist film,
   forming a metal layer on the electrode by the electrocasting, and
   injection molding of a resin, using the metal layer peeled off from the electrode as a stamper,
   wherein the electrode contains Ni element as the main component as well as Ag element by less than 50% by weight.

10. The production method for an optical disc according to claim 1, wherein the metal layer is made from nickel.

11. The production method for an optical disc according to claim 2, wherein the metal layer is made from nickel.

12. The production method for an optical disc according to claim 3, wherein the metal layer is made from nickel.

13. The production method for an optical disc according to claim 4, wherein the metal layer is made from nickel.

14. The production method for an optical disc according to claim 5, wherein the metal layer is made from nickel.

15. The production method for an optical disc according to claim 6, wherein the metal layer is made from nickel.

16. The production method for an optical disc according to claim 7, wherein the metal layer is made from nickel.

17. The production method for an optical disc according to claim 8, wherein the metal layer is made from nickel.

18. The production method for an optical disc according to claim 9, wherein the metal layer is made from nickel.

19. The production method for an optical disc according to claim 1, wherein the metal layer is made from nickel alloy.

20. The production method for an optical disc according to claim 2, wherein the metal layer is made from nickel alloy.

21. The production method for an optical disc according to claim 3, wherein the metal layer is made from nickel alloy.

22. The production method for an optical disc according to claim 4, wherein the metal layer is made from nickel alloy.

23. The production method for an optical disc according to claim 5, wherein the metal layer is made from nickel alloy.

24. The production method for an optical disc according to claim 6, wherein the metal layer is made from nickel alloy.

25. The production method for an optical disc according to claim 7, wherein the metal layer is made from nickel alloy.

26. The production method for an optical disc according to claim 8, wherein the metal layer is made from nickel alloy.

27. The production method for an optical disc according to claim 9, wherein the metal layer is made from nickel alloy.

* * * * *